(12) United States Patent
Zhang et al.

(10) Patent No.: US 8,649,637 B2
(45) Date of Patent: Feb. 11, 2014

(54) POLARIZATION INTERFERENCE OPTICAL INTERLEAVER

(75) Inventors: Weiwei Zhang, Shenzhen (CN); Jun Huang, Shenzhen (CN); Zeqin Wang, Shenzhen (CN); Hong Xie, Shenzhen (CN)

(73) Assignee: O-Net Communications (Shenzhen) Limited, Shenzhen (CN)

( * ) Notice: Subject to any disclaimer, the term of this patent is extended or adjusted under 35 U.S.C. 154(b) by 17 days.

(21) Appl. No.: 13/503,368

(22) PCT Filed: Apr. 26, 2011

(86) PCT No.: PCT/CN2011/073310
§ 371 (c)(1),
(2), (4) Date: Apr. 22, 2012

(87) PCT Pub. No.: WO2012/122728
PCT Pub. Date: Sep. 20, 2012

(65) Prior Publication Data
US 2012/0237157 A1  Sep. 20, 2012

(30) Foreign Application Priority Data
Mar. 17, 2011 (CN) .......................... 2011 1 0065185

(51) Int. Cl.
*G02B 6/00* (2006.01)
(52) U.S. Cl.
USPC .................... 385/11; 385/15; 385/24; 385/25
(58) Field of Classification Search
USPC .......................... 385/11, 15, 24, 25
See application file for complete search history.

(56) References Cited

U.S. PATENT DOCUMENTS 6,907,167 B2 * 6/2005 Jeong et al. ..................... 385/39
6,920,261 B2 * 7/2005 Inada et al. ..................... 385/24

OTHER PUBLICATIONS

International Search Report of PCT Patent Application No. PCT/CN2011/073310.

* cited by examiner

*Primary Examiner* — Jennifer Doan

(57) ABSTRACT

The present patent application relates to a polarization interference optical interleaver, which includes a first port to transmit the first optical signal through the first optical path, a second port to transmit the second optical signal and a third port to transmit the third optical signal. The first optical signal passes through the first optical path and splits into the second optical signal and the third optical signal by the first and the second light splitting/combining crystals and the interference crystal group. The interference crystal group is located between the first and the second light splitting/combining crystals. The second optical signal and the third optical signal are received and reflected by a reflecting mirror. Then the second optical signal and the third optical signal output through the second port and the third port respectively. The second optical signal reflected by the reflecting mirror transmits along the first optical path of the first optical signal and passes through the interference crystal group, then walks off the first optical path by light walk-off device and outputs through the second port. The third optical signal reflected by the reflecting mirror transmits along the second optical path and passes through the interference crystal group, then outputs through the third port. There are only four beams in the interference crystal group of the present patent application. So the volume of the interference crystal group is minimized and the cost is reduced.

19 Claims, 4 Drawing Sheets

POLARIZATION INTERFERENCE OPTICAL INTERLEAVER

FIELD OF THE PATENT APPLICATION

The present patent application relates to optical communications devices technology, especially relates to a low-cost polarization interference optical interleaver.

BACKGROUND

As the rapid development of the information technologies, the information communication of voice, images and data is increasing. The most of all, as the extensive use of the internet, people raise higher request to the wide-band communication. In order to meet the needs of wide-band communication by low-cost and high-quality system in a shortest possible time, wavelength division multiplexing (WDM) technology is widely used. WDM technology increases the number of channels basing on the principle of different wavelengths can be transmitted in a same path. This improves the signal transmission multiplied. The capacity of the fiber-optical communication can be expanded without setting up new path of optical fibers by WDM so that the cost of the network construction is reduced.

Another way of improving the transmission capacity of the optical fiber is to further reduce channel spacing. At present, the channel spacing specified by International Telecommunication Union (ITU), is 100 Hz or 200 Hz. The optical interleaver is preferred for the expanding of the capacity of the current system with lower cost because the optical interleaver can change the channel spacing without changing of the current equipments and system. A 100 Hz optical interleaver can be used for the current system with channel spacing of 200 Hz and a 50 Hz optical interleaver can be used for the current system with channel-spacing of 100 Hz. The function of the optical interleaver is to split an equally spaced optical signal into an odd channel and an even channel alternately by expanding the channel spacing. The channel spacing is doubled which is called demultiplexing. Or the optical interleaver multiplex two signals into one signal by reducing the channel spacing. The optical interleaver can expand the capacity without changing of the current equipments and thus the cost is reduced. So the optical interleaver is very important for the upgrade of the existing fiber-optical communication WDM systems. At present, the commonly used optical interleavers are fiber Bragg Grating type, birefringent crystal type, Mach-Zehnder interferometer type, and resonant cavity type.

In the existing technology, the optical interleavers with birefringent crystal are compact structure with reflecting mirror. U.S. Pat. No. 6,697,198 disclosed a crystal type of optical interleaver with reflecting structure. As shown in FIG. 1, the first optical signal beam entering from the first port 400 passes through the first optical path D1 and splits into two beams by the first walk-off crystal 415, i.e., an upper light beam and an under light beam. Then the first optical signal beam passes through an interference crystal group 418 and is splitted into a second optical signal beam and a third optical signal beam by the second walk-off crystal 430. The second optical signal beam and the third optical signal beam are reflected to the second walk-off crystal 430 by the reflector 450. Then the second optical signal beam and the third optical signal beam pass through the second optical path D2 and the third optical path D3 respectively. After passing through the interference crystal group 418, the second optical signal beam and the third optical signal beam output via the collimator 495 of the second port and the collimator 490 of the third port. The first optical signal beam passes through the first optical path and is split into a second optical signal beam and a third optical signal beam by the second walk-off crystal 430. The second optical signal beam and the third optical signal beam pass through the second optical path and the third optical path respectively. The second optical path and the third optical path are coupled with the first optical path and output through the collimator 495 and the collimator 490 after passing through the interference crystal group 418. The interference crystal group 418 includes six light beams of the first optical path, the second optical path and the third optical path. So the interference crystal group 418 needs to have a larger volume to accommodate the six light beams and the cost of the device is increased.

SUMMARY

In order to solve the problem mentioned above, the present patent application provides a polarization interference optical interleaver with low cost and small volume.

The polarization interference optical interleaver of the present patent application includes a first port to transmit the first optical signal through the first optical path, a second port to transmit the second optical signal and a third port to transmit the third optical signal. The first optical signal passes through the first optical path and is splitted into the second optical signal and the third optical signal by the first and the second light splitting/combining crystals and the interference crystal group. The interference crystal group is located between the first and the second light splitting/combining crystals. The second optical signal and the third optical signal are received and reflected by a reflecting mirror. Then the second optical signal and the third optical signal output through the second port and the third port respectively. The second optical signal reflected by the reflecting mirror transmits along the first optical path of the first optical signal and passes through the interference crystal group, then walks off the first optical path by light walk-off device and outputs through the second port. The third optical signal reflected by the reflecting mirror transmits along the second optical path and passes through the interference crystal group, then outputs through the third port.

According to one aspect of the present patent application, the light walk-off device is a birefringent crystal or a PBS prism to make the returned second optical signal deviate from the first optical path and output through the second port.

The advantages of the present patent application are as below:

The optical signal of the present patent application is split by the first light splitting/combining crystal and is combined by the interference crystal group, the waveplates and the Faraday rotator. Then the optical signal is reflected to the interference crystal group by the reflector and pass through it. One optical signal is reflected back and passes through the interference crystal group along the same route of the incident beam. Therefore there are only four beams in the interference crystal group and the volume of the interference crystal group is minimized and the cost is reduced.

DESCRIPTION OF THE DRAWINGS

The embodiments of the present patent application will be better understood by reading the following detailed description conjunction with the accompanying drawings.

DETAILED DESCRIPTION OF THE PATENT APPLICATION

The principles of the polarization interference optical interleaver in the present patent application will be further described with reference to the drawings.

Figure 1:
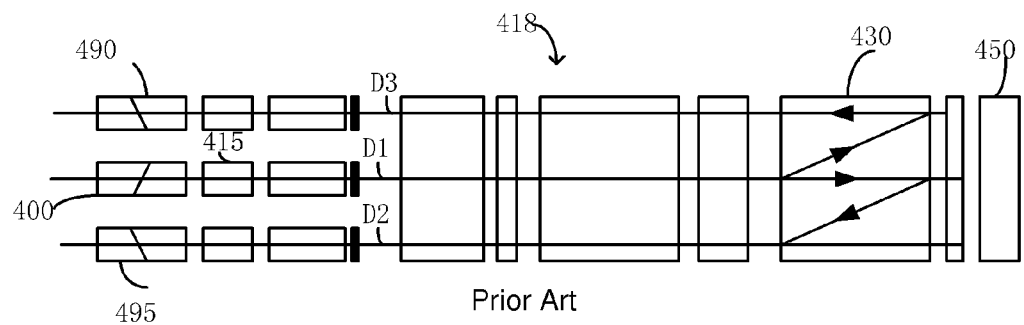
FIG. 1 is the structure schematic diagram of the polarization optical interleaver of prior art.
Figure 2:
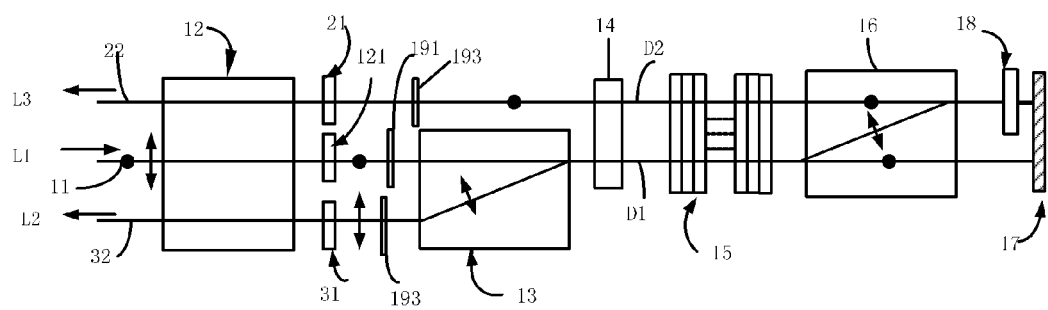
FIG. 2 is the side view of the first embodiment of the polarization interference optical interleaver in the present patent application.
Figure 3:
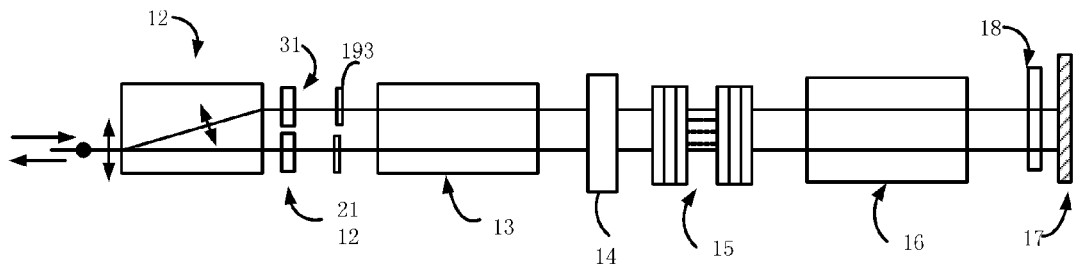
FIG. 3 is the top view of the first embodiment of the polarization interference optical interleaver in the present patent application.

FIG. 2 and FIG. 3 are the structure schematic diagrams of the first embodiment of the polarization interference optical interleaver in the present patent application. As show in FIG. 2 and FIG. 3, the optical interleaver 1 of the present patent application includes a first port 11 to input the first optical signal L1. The first port 11 is a collimator including a GRIN lens to collimate the beam to the first light splitting/combining crystal 12. The first optical signal L1 transmits through the first optical path D1 and splits into two beams with mutually perpendicular polarization states in space: an ordinary light and an extraordinary light. The mutually perpendicular ordinary light and extraordinary light are converted into two mutually parallel beams by the first half-waveplates 121. The two mutually parallel beams pass through a birefringent crystal 13 and is rotated 45 degrees counterclockwise by the Faraday rotator 14. The first optical signal splits into the second optical signal L2 and the third optical signal L3 by the interference crystal group 15 and the second light splitting/combining crystal 16. Wherein the third optical signal L3 is reflected by the reflector 17 and is rotated 90 degrees twice by the quarter-waveplates 18. Then the third optical signal L3 is reflected back along the second optical path D2 and passes through the second light splitting/combining crystal 16, the interference crystal group 15, the Faraday rotator 14 and the first half-waveplates 21, and then outputs through the third port 22. The second optical signal L2 is reflected back along the first optical path D1 and passes through the birefringent crystal 13 and the third half-waveplates 31. Then the second optical signal L2 walks off the first optical path D1 by the birefringent crystal 13 and outputs through the second port 32.

A first polarizer 191, a second polarizer 192 and a third polarizer 193 are installed behind the first half-waveplates 121, the second half-waveplates 21 and the third half-waveplates 31 to ensure the required polarization states of the input beam and the output beam from the first half-waveplates 121, the second half-waveplates 21 and the third half-waveplates 31.

Figure 4:
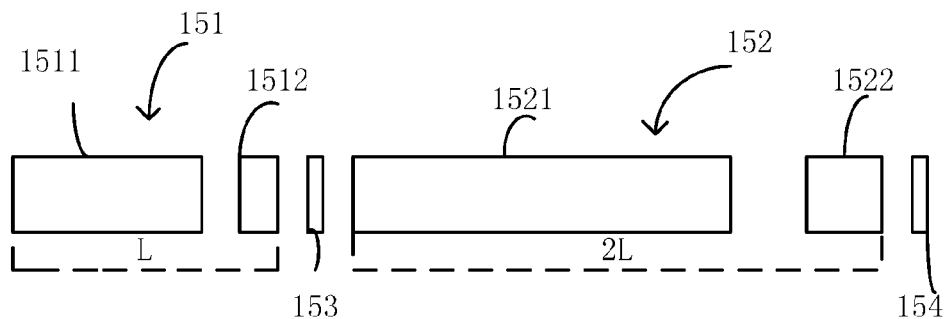
FIG. 4 is the exploded view of the interference crystal group 15.

FIG. 4 is the exploded view of the interference crystal group 15. As show in FIG. 4, the interference crystal group 15 is located between the first light splitting/combining crystal 12 and the second light splitting/combining crystal 16 along the first optical path D1 and the second optical path D2. The interference crystal group 15 further includes a first birefringent crystal 151 and a second birefringent crystal 152. The first birefringent crystal 151 includes two crystals and the length of the optical path of the two crystals is L. The combination of the crystals has higher temperature stability comparing with a single crystal. In this embodiment, crystal 1511 is $YVO_4$ crystal, crystal 1512 is $LiNO_3$ crystal. The thickness of the crystal 1511 and the crystal 1512 meet the requirements of the channels. The second birefringent crystal 152 also includes two crystals and the length of the optical path of the two crystals is 2 L. In this embodiment, crystal 1521 is $YVO_4$ crystal, crystal 1522 is $LiNO_3$ crystal. A third half-waveplates 153 is installed between the first birefringent crystal 151 and the second birefringent crystal 152. A fourth half-waveplates 154 is installed between the second birefringent crystal 152 and the second light splitting/combining crystal 16.

Figure 5:
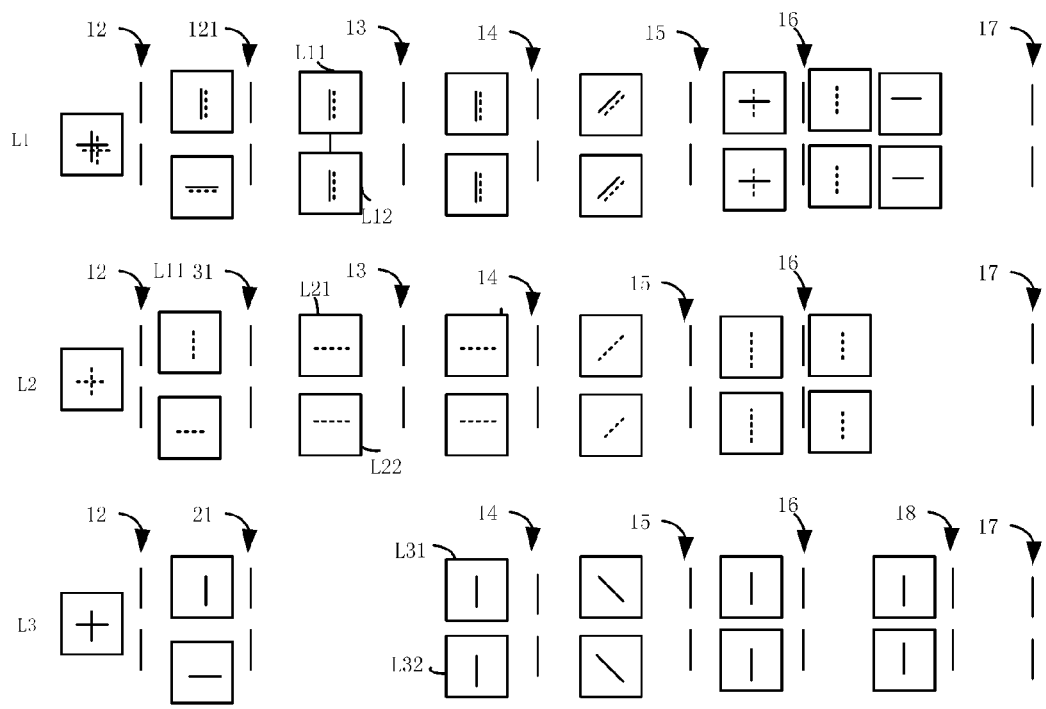
FIG. 5 is the variation diagram of the polarization state of the second embodiment of the polarization interference optical interleaver in the present patent application.

FIG. 5 is the transformation process of the polarization state in the present patent application. As show in FIG. 5, the first incident beam L1 is split into two beams with mutually perpendicular polarization states by the light splitting/combining crystal 12, i.e., an ordinary beam L11 and an extraordinary beam L12. The polarization state of beam L12 is rotated by the first half-waveplates 11 so that to be parallel with the polarization state of the beam L11. Then the ordinary beam L11 and the extraordinary beam L12 are rotated 45 degrees clockwise by the Faraday rotator 14. The first optical signal L1 is split into a second optical signal L2 and a third optical signal L3 by the light splitting/combining crystal 16. That is to say, the first optical signal L1 is split into mutually perpendicular beams by the light splitting/combining crystal 16, i.e., ordinary beams L21 and L31, extraordinary beams L22 and L32. The beams L21 and L22 return along the first optical path D1 of the first optical signal L1. The polarization states of the beams L21 and L22 are rotated 45 degrees clockwise by the interference crystal group 15 and are rotated 45 degrees clockwise by the Faraday rotator 14. The polarization states of the beams L21 and L22 convert into being parallel with each other and then walks off the first optical path D1 by the birefringent crystal 13. The polarization state of the beam L21 is converted into vertical polarization state by the second half-waveplates 31 and perpendicular to the polarization state of the beam L22. The beams L21 and L22 are combined to form the second optical signal L2 by the first light splitting/combining crystal 12 and then output through the second port 22. The beams L31 and L32 are reflected by the reflector 24 and pass through the quarter-waveplates 18 again. Then the beams L31 and L32 return back to the second light splitting/combining crystal 16. The polarization states of the beams L31 and L32 are rotated 90 degrees by passing the quarter-waveplates 18 twice and convert into vertical polarization states. The polarization states of the beams L31 and L32 are rotated 45 degrees counterclockwise by the interference crystal group 15 and are rotated 45 degrees clockwise by the Faraday rotator 14. So the polarization states of the beams L31 and L32 convert into vertical polarization states again. The polarization state of the beam L32 is rotated to be horizontal polarization state by the third half-waveplates 21 so that to be perpendicular to the polarization state of the beam L31. The the beams L31 and L32 are combined by the first light splitting/combining crystal 12 and output through the third port 32.

Figure 6:
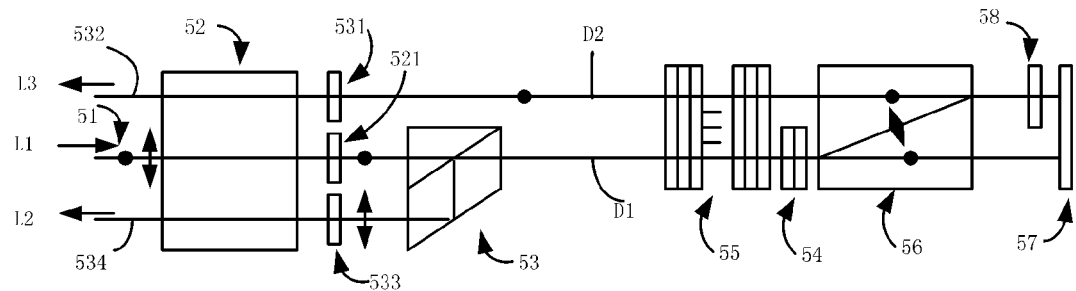
FIG. 6 is the side view of the second embodiment of the polarization interference optical interleaver in the present patent application.
Figure 7:
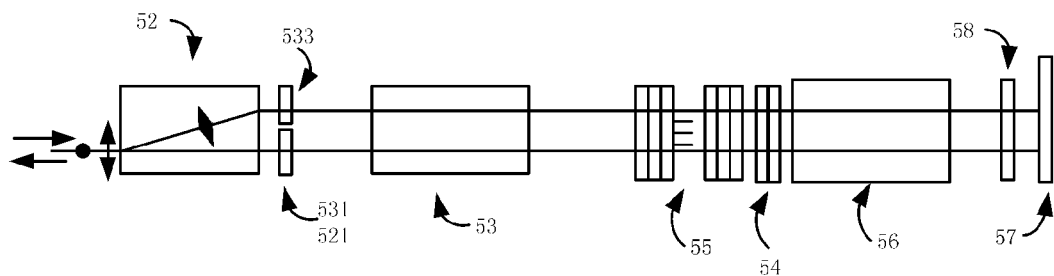
FIG. 7 is the top view of the second embodiment of the polarization interference optical interleaver in the present patent application.

FIG. 6 and FIG. 7 are the structure schematic diagrams of the second embodiment of the polarization interference optical interleaver in the present patent application. As show in FIG. 6 and FIG. 7, the optical interleaver 5 of the present patent application includes a first port 51 to input the first optical signal L1. The first port 51 is a collimator including a GRIN lens to collimate the beam to the first light splitting/combining crystal 52. The first optical signal L1 transmits through the first optical path D1 and splits into two beams with mutually perpendicular polarization states in space, i.e., an ordinary light and an extraordinary light. The mutually perpendicular ordinary light and extraordinary light are converted into two mutually parallel beams by the first half-waveplates 521. The two mutually parallel beams pass through a PBS prism 53 and the birefringent crystal group 55. The two mutually parallel beams are then rotated 90 degrees counterclockwise by the polarization rotating device 54. The polarization rotating device 54 includes a 45 degrees Faraday rotator and a half-waveplates. The first optical signal is split into the second optical signal L2 and the third optical signal L3 by the second light splitting/combining crystal 56. The third optical signal L3 is reflected by the reflector 57 and is rotated 90 degrees twice by the quarter-waveplates 58. Then the third optical signal L3 is reflected back along the second optical path D2 and passes through the second light splitting/combining crystal 56, the polarization rotating device 54, the interference crystal group 55 and the second half-waveplates 531. Then the third optical signal L3 outputs through the third port 532. The second optical signal L2 is reflected back along the first optical path D1 and is deviated from the first optical path D1 by the PBS prism 53. Then the second optical signal L2 outputs through the second port 534.

Figure 8:
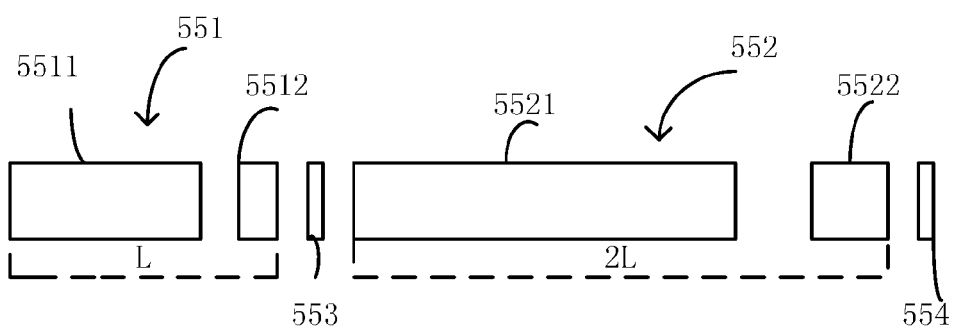
FIG. 8 is the exploded view of the interference crystal group 55.

FIG. 8 is the exploded view of the interference crystal group 55. As show in FIG. 8, the interference crystal group 55 is located between the first light splitting/combining crystal 52 and the second light splitting/combining crystal 56 along the first optical path D1 and the second optical path D2. The interference crystal group 55 further includes a first birefringent crystal 551 and a second birefringent crystal 552. The first birefringent crystal 551 includes two crystals and the length of the optical path of the two crystals is L. The combination of the crystal has higher temperature stability compared to a single crystal. In this embodiment, crystal 5511 is $YVO_4$ crystal, crystal 5512 is $LiNO_3$ crystal. The thickness of the crystal 5511 and the crystal 5512 meet the requirements of the channels. The second birefringent crystal 552 includes two crystals and the length of the optical path of the two crystals is 2 L. In this embodiment, crystal 5521 is $YVO_4$ crystal, crystal 5522 is $LiNO_3$ crystal. A third half-waveplates 553 is installed between the first birefringent crystal 551 and the second birefringent crystal 552. A fourth half-waveplates 554 is installed between the second birefringent crystal 552 and the second light splitting/combining crystal 56.

Figure 9:
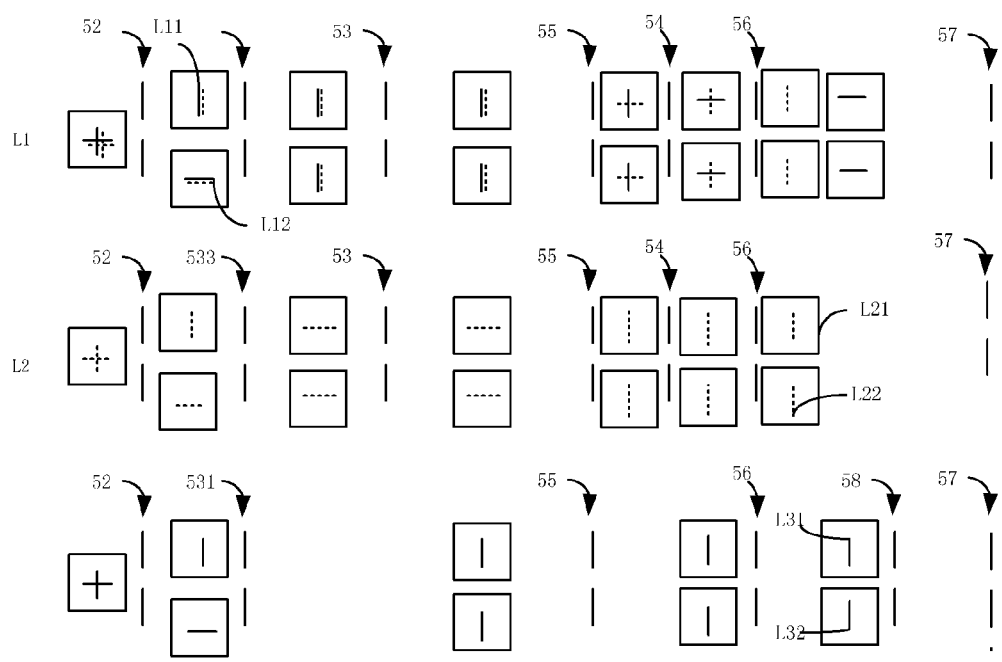
FIG. 9 is the variation diagram of the polarization state of the second embodiment of the polarization interference optical interleaver in the present patent application.

FIG. 9 is the transformation process of the polarization state in the present patent application. As show in FIG. 9, the first incident beam L1 is split into two beams with mutually perpendicular polarization states by the light splitting/combining crystal 52, i.e., an ordinary beam L11 and an extraordinary beam L12. The polarization state of the beam L12 is rotated by the first half-waveplates 521 so that to be parallel with the polarization state of the beam L11. The polarization states of the beam L11 and the beam L12 convert into vertical polarization states. After transmitting through the PBS prism 53, one optical signal is rotated 90 degrees by the interference crystal group 55. Both the ordinary beam L11 and the extraordinary beam L12 are rotated 90 degrees clockwise by the polarization rotating device 54. The first optical signal L1 is split into a second optical signal L2 and a third optical signal L3 by the light splitting/combining crystal 56. That is to say, the first optical signal L1 is split into mutually perpendicular beams by the light splitting/combining crystal 56, i.e, ordinary beams L21 and L31, extraordinary beams L22 and L32. The beams L21 and L22 return along the first optical path D1 of the first optical signal L1. The polarization states of the beams L21 and L22 are rotated 90 degrees clockwise by the interference crystal group 55 so that to be parallel with each other. The beams L21 and L22 are reflected by the PBS prism 53 and deviate from the first optical path D1. The polarization state of the beam L21 is converted into vertical polarization state by the second half-waveplates 31 and perpendicular to the polarization state of the beam L22. The beams L21 and L22 are combined to form the second optical signal L2 by the first light splitting/combining crystal 12 and then output through the second port 534. The beams L31 and L32 are reflected by the reflector 57 and pass through the quarter-waveplates 58 again. Then the beams L31 and L32 return back to the second light splitting/combining crystal 56. The polarization states of the beams L31 and L32 are rotated 90 degrees by passing the quarter-waveplates 18 twice and convert into vertical polarization states. The polarization state of the beam L32 is rotated to be horizontal polarization state by the third half-waveplates 531 so that to be perpendicular with the polarization state of the beam L31. The beams L31 and L32 are combined by the first light splitting/combining crystal 52 and output through the third port 532.

The advantages of the present patent application are as below:

The optical signal of the present patent application is split by the first light splitting/combining crystal and is combined by the interference crystal group, the waveplates and the Faraday rotator. The optical signal then reflects to the interference crystal group by the reflector and passes through it. One optical signal is reflected back and passes through the interference crystal group along the same route of the incident beam. Therefore there are only four beams in the interference crystal group and the volume of the interference crystal group is minimized and the cost is reduced.

Although the patent application has been described with respect to certain embodiments, the description is not regarded as limiting of the patent application. The alternative changes or modifications of aspects of the embodiments of the patent application fall within the spirit of the present patent application.

What is claimed is:

1. A polarization interference optical interleaver, comprising a first port to transmit the first optical signal through the first optical path, a second port to transmit the second optical signal and a third port to transmit the third optical signal; the first optical signal pass through the first optical path and is split into the second optical signal and the third optical signal by the first and the second light splitting/combining crystals and the interference crystal group; the interference crystal group is located between the first and the second light splitting/combining crystals; the second optical signal and the third optical signal are received and reflected by a reflecting mirror; the second optical signal and the third optical signal output through the second port and the third port respectively; the second optical signal reflected by the reflecting mirror transmits along the first optical path of the first optical signal and passes through the interference crystal group, then walks off the first optical path by light walk-off device and outputs through the second port; the third optical signal reflected by the reflecting mirror transmits along the second optical path and passes through the interference crystal group, then outputs through the third port.

2. The polarization interference optical interleaver in claim 1, wherein the light walk-off device is a birefringent crystal; the birefringent crystal deviates the reflected second optical signal from the first optical path; the second optical signal output through the second port.

3. The polarization interference optical interleaver in claim 1, wherein the light walk-off device is a PBS prism; the PBS prism deviates the reflected second optical signal from the first optical path; the second optical signal output through the second port.

4. The polarization interference optical interleaver in claim 1, further comprising a polarization rotating device; the polarization rotating device is located between the first light splitting/combining crystals and the interference crystal group; the polarization rotating device rotates the polarization states of the first optical signal, the second optical signal and the third optical signal.

5. The polarization interference optical interleaver in claim 4, wherein the polarization rotating device is a Faraday rotator.

6. The polarization interference optical interleaver in claim 4, wherein the polarization state rotating device is configured to the first optical path between the interference crystal group and the second light splitting/combining crystal; the polarization rotating device changes the polarization states of the first optical signal and the second optical signal.

7. The polarization interference optical interleaver in claim 6, wherein the polarization rotating device comprises a Faraday rotator and a half-waveplates; the polarization rotating device rotates the polarization state of the first optical signal passing through the polarization rotating device in the forward direction 90 degrees; the polarization state of the second optical signal passing through the polarization rotating device in the reverse direction does not change.

8. The polarization interference optical interleaver in claim 1, wherein the first light splitting/combining crystal is located at the front end of the first port, the second port and the third port; the first light splitting/combining crystal splits the first optical signal and combines the second optical signal and the third optical signal; the second optical signal and the third optical signal output through the second port and the third port.

9. The polarization interference optical interleaver in claim 1, wherein the first light splitting/combining crystals are light splitting/combining crystal group located at the front end of the first port, the second port and the third port respectively; the first light splitting/combining crystal splits the first optical signal and combines the second optical signal and the third optical signal; the second optical signal and the third optical signal output through the second port and the third port.

10. The polarization interference optical interleaver in claim 8, wherein the first half-waveplates, the second half-waveplates and the third half-waveplates are located at the back end of the first light splitting/combining crystal and change the polarization states of the first optical signal, the second optical signal and the third optical signal respectively.

11. The polarization interference optical interleaver in claim 10, further comprising a first polarizer, a second polarizer and a third polarizer; the first polarizer, the second polarizer and the third polarizer are located behind the first half-waveplates, the second half-waveplates and the third half-waveplates respectively and filter the light beams of different polarization states.

12. The polarization interference optical interleaver in claim 1, further comprising a quarter-waveplates located on the second optical path between the reflecting mirror and the second light splitting/combining crystal; the quarter-waveplates rotates the polarization state of the third optical signal.

13. The polarization interference optical interleaver in claim 1, wherein the interference crystal group comprises a first birefringent crystal and a second birefringent crystal; the length of the first birefringent crystal is L and the length of the second birefringent crystal is 2 L.

14. The polarization interference optical interleaver in claim 13, wherein a third half-waveplates and a fourth half-waveplates are installed behind the first birefringent crystal and the second birefringent crystal respectively; the third half-waveplates and the fourth half-waveplates change the polarization state of the light beam entering into the interference crystal group.

15. The polarization interference optical interleaver in claim 13, wherein the first birefringent crystal and the second birefringent crystal comprise at least two crystals of different materials.

16. The polarization interference optical interleaver in claim 15, wherein one crystal is $YVO_4$ crystal, another crystal is a $LiNO_3$ crystal.

17. The polarization interference optical interleaver in claim 15, wherein one crystal is $YVO_4$ crystal, another crystal is $TiO_2$ crystal.

18. The polarization interference optical interleaver in claim 15, wherein one crystal is a-BBO crystal, another crystal is $YVO_4$ crystal.

19. The polarization interference optical interleaver in claim 14, wherein the first birefringent crystal and the second birefringent crystal comprise at least two crystals of different materials.

* * * * *